Sept. 16, 1969　　　P. I. TEVIS ET AL　　　3,467,179
RECIRCULATING HEATING DEVICE
Filed Nov. 26, 1965　　　　　　　　　　　　3 Sheets-Sheet 1

United States Patent Office 3,467,179
Patented Sept. 16, 1969

3,467,179
RECIRCULATING HEATING DEVICE
Petr Isaakovich Tevis, 1 Krasnoarmeisky pereulok 12, kv. 44; Vladimir Nikolaevich Kostochkin, Kurbatovsky pereulok 7, kv. 11; Vladimir Alexandrovich Ananev, Novo-Khoroshovskoe chaussee, kvartal 82, korpus 45–b, kv. 78; Viktor Mikhailovich Krjukov, 1 Krasnoarmeisky pereulok 12, kv. 97; and Dmitry Mikhailovich Mitin, Koptevskaya ulitsa 30, kv. 19, all of Moscow, U.S.S.R.
Filed Nov. 26, 1965, Ser. No. 509,894
Int. Cl. F24h *3/06;* F04d *29/26*
U.S. Cl. 165—122                    4 Claims

ABSTRACT OF THE DISCLOSURE

A recirculating heating device, in which a gaseous medium undergoes circulation within a closed system communicating with a working chamber, but with no communication with the ambient atmosphere.
The rotor of a centrifugal fan serves as the heating means and the means for circulating the medium, the fan being provided with blades having an inlet angle of 145–155° and an outlet angle of 20–25°. The working chamber is capable of serving as an oven, a heating element, or the like.

---

The present invention relates to recirculating heating devices, and more particularly to recirculating heating devices provided with a centrifugal fan to circulate a working medium within a closed circuit.

Recirculating heating devices known in the art comprise a centrifugal fan, with the working medium, principally air, being circulated within a closed circuit. Air is heated by means of electrical or other heating elements.

Such devices are used in heat treatment of metal articles when a uniform temperature is to be produced in the space around the articles being treated.

The main disadvantages of the aforementioned devices are the complexity of their design due to the necessity of reliable insulation of the electrical heating elements; the short life of these elements and high production costs as well as a great consumption of power and materials.

It is an object of the present invention to provide a recirculating heating device in which the fan itself functions as a heater.

Another object of the invention is to provide a recirculating heating device in which the fan is a source of heat and is installed outside the chamber where the heat exchange between the working medium and the object being heated takes place.

Still another object of the invention is to provide a recirculating heating device in which the fan is installed inside the heat-exchange chamber.

A further object of the invention is to provide a recirculating heating device with a fan which produces a concentrated heat flux of the working medium, the design thereof being relatively simple.

A still further object of the invention is to provide a recirculating heating device in which the temperature of the working medium can be regulated in a relatively simple manner.

In accordance with the above and other objects, the invention comprises a new device and a combination of parts and elements thereof as described here and below and claimed in the appended claims, with the understanding, however, that various modifications in the exact embodiment of the invention as disclosed herein may be made without departing from the true idea and scope of the invention.

Other objects and advantages of the invention will become apparent from a consideration of the description of an exemplary embodiment of the device given herebelow with due reference to the accompanying drawings, wherein.

Figure 1:
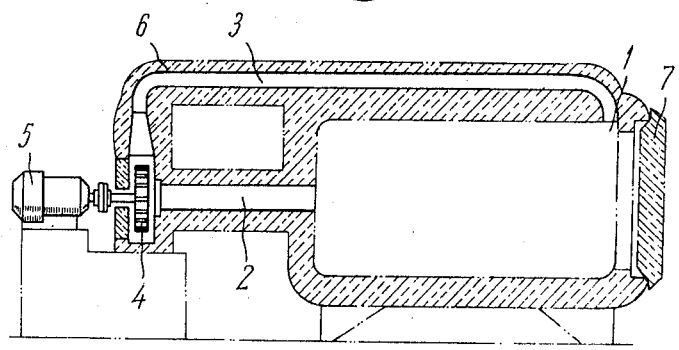
FIG. 1 is a recirculating heating device with a centrifugal fan mounted outside the working chamber.

The recirculating heating device (FIG. 1) comprises: a working chamber 1 to accommodate metal articles to be treated therein.

Through an intake duct 2 and a plenum duct 3, the chamber 1 is connected to the centrifugal fan 4 rotated by an electric motor 5. The chamber 1, the impeller of the fan 4, and the ducts 2 and 3 are provided with heat insulation 6. For charging and discharging the articles the chamber 1 is provided with a hinged door 7.

The centrifugal fan 4, through the duct 2, sucks in the air from the chamber 1, heats it due to a predetermined curvature of the blades and forces heated air into the chamber 1 through the plenum duct 3. The heated air exchanges heat with the metal articles under treatment, then the fan sucks it in again, and the cycle is repeated.

The rate of air heating is rather high and the temperature gradient is uniformly distributed throughout the whole air volume.

The curved blades of the fan provide for an effective heating and have obtuse inlet and acute outlet angles.

Figure 2:
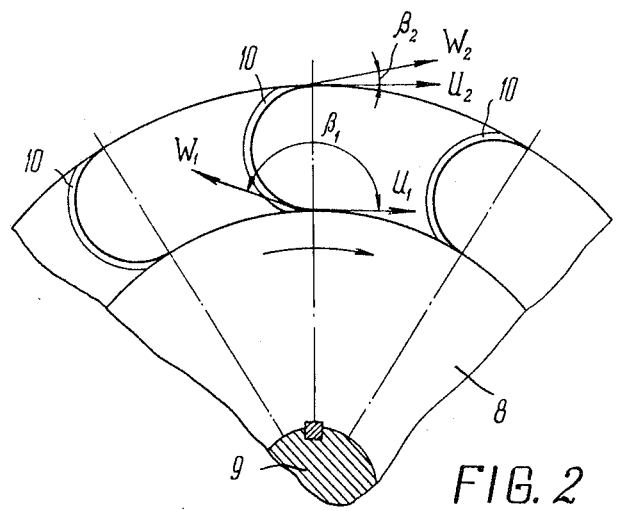
FIG. 2 is a part of the centrifugal fan impeller.

FIG. 2 shows a part of the centrifugal fan impeller providing a heating effect. An impeller 8 is set on a shaft 9.

Blades 10 of the impeller 8 are of curvilinear shape and are concave in the direction of the rotation of the impeller (the direction is shown by the arrow).

With the impeller 8 rotating, the inner ends of the blades have a circumferential velocity $u_1$, the outer ends of the blades having a circumferential velocity $u_2$. The air between the blades moves along the circumference together with the impeller and simultaneously, under the effect of the centrifugal forces, moves in relation to the impeller with the velocity $w_1$ at the inner ends of the blades and $w_2$ at the outer ends of the blades.

The inlet angle $\beta_1$ of the blades formed by vectors $u_1$ and $w_1$ equals 145–155°, while the value of the outlet angle $\beta_2$ of the blades formed by vectors $u_2$ and $w_2$ equals 20–25°.

With these values of inlet and outlet angles, the centrifugal fan produces the maximum effect of heating the air circulating therethrough.

Figure 3:
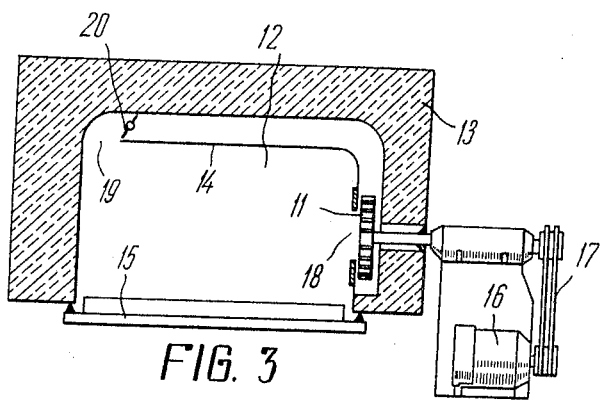
FIG. 3 is a recirculating heating device with a centrifugal fan mounted within the working chamber.

FIG. 3 shows a recirculating heating device with a centrifugal fan 11 located within a working chamber 12 provided with heat insulation 13.

The air flow inside the device is directed by means of a partition 14 which separates the fan from the main space of the chamber. The articles to be treated are charged into the chamber through a removable bottom 15.

The fan is driven in rotation by an electric motor 16 via a belt 17.

The air is sucked and forced through appropriate openings 18 and 19 in the partition 14.

The amount of the circulating air is controlled by a throttle 20 located in the opening 19.

Figure 4:
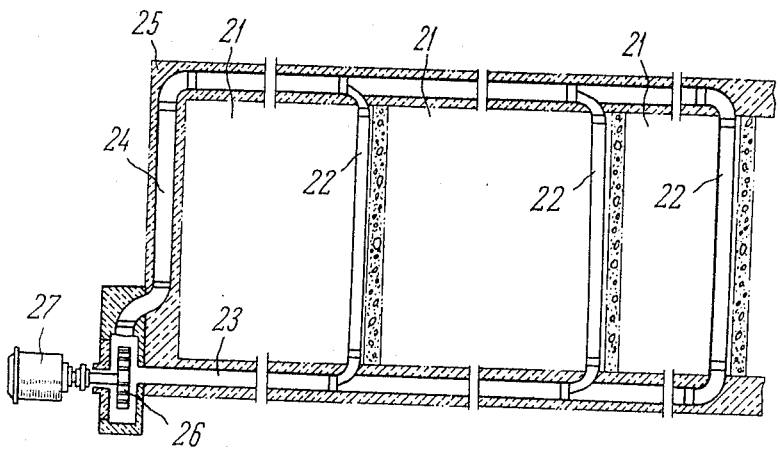
FIG. 4 is a recirculating heating device designed to heat buildings.

FIG. 4 shows an embodiment of the recirculating heating device used for heating buildings.

In rooms 21 of the building there are mounted tubular heaters 22 which are intercommunicated with a suction duct 23 and a pressure duct 24 located inside walls 25 of the building.

A centrifugal fan 26 is rotated by an electric motor 27.

To increase the heating effect the centrifugal fan (FIG. 5) is made with several impellers 28 located in sections 29. The impeller of the last stage is disposed in a working chamber 30.

The air is sucked from the space formed by a partition 31 with an opening 32, located in front of the impeller of the first stage.

Between the impellers 28 there are mounted partitions with guiding blades 33 located along the air passages.

The impellers 28 of the multi-stage fan are mounted on a common shaft 34 driven in rotation by an electric motor 35 in a bearing 36.

Figures 5, 6:
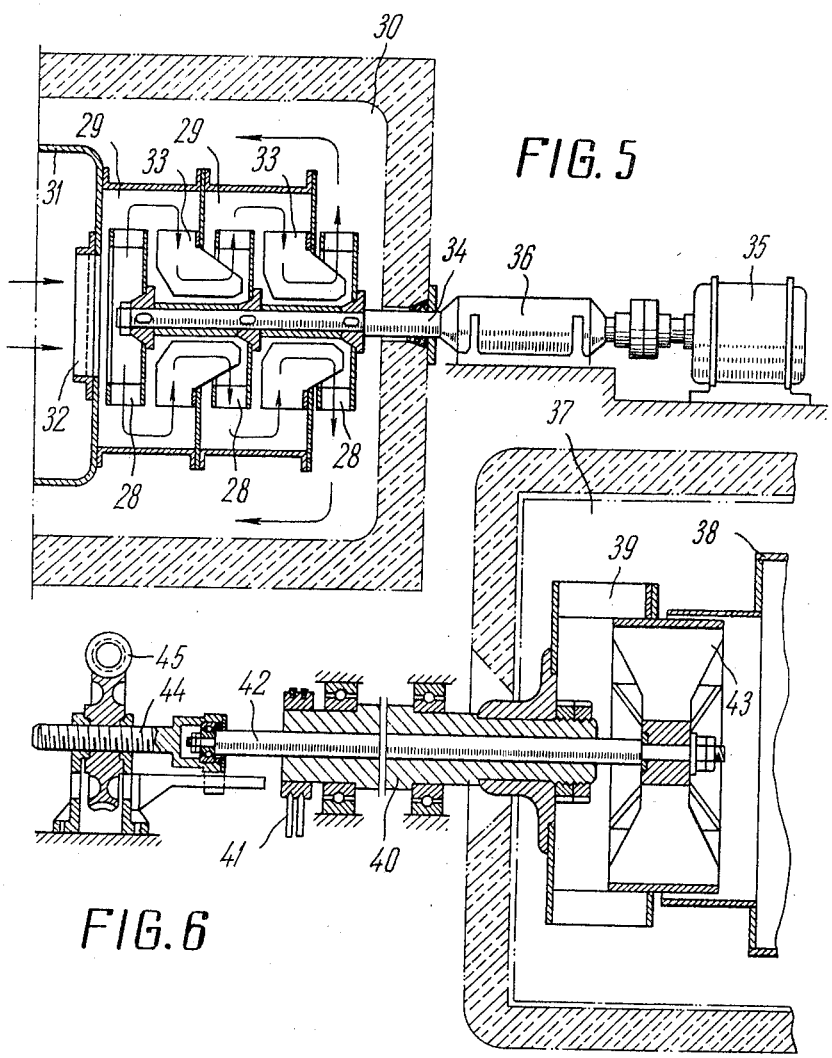
FIG. 5 is a three-stage centrifugal fan of the recirculating heating device.
FIG. 6 is a centrifugal fan with an arrangement for controlling the heating temperature.

FIG. 6 shows a centrifugal fan with an arrangement used to control a heating temperature.

In a working chamber 37 there is mounted a cylindrical partition 38, at one end of which there rotates a centrifugal fan 39 mounted on a hollow shaft 40.

The shaft is driven in rotation by a flexible gear 41.

Through the hollow shaft 40 there passes a rod 42 with an annular throttle 43 fixed thereon.

The rod 42 together with the throttle 43 may perform a reciprocating motion by means of a feed screw 44 moved by a worm gear 45 connected to a pilot motor (not shown in the drawing).

The pilot motor is incorporated into the electric circuit used for automatic control of the temperature of the chamber 37, and is switched on with a predetermined direction of its rotation for a period of time corresponding to the temperature value in the chamber.

Longitudinal movement of the throttle 43 brings about a change in the working width of the blades of the fan 39 and, hence, a change in the amount of air circulating through the fan.

The temperature of air circulating in the heating device may also be controlled by reversing the rotation of the fan, or by varying the velocity of its rotation.

The temperature may also be controlled by periodically switching off the fan.

The recirclating heating device in accordance with the invention meets the present day engineering requirements as it allows to dispense with expensive heaters, providing at the same time for a uniform temperature field in the working chamber of the order of ±1–3°, with the efficiency of the fan used as a heater not lower than 95%, since all kinds of losses result in heating the working medium.

Though the present invention is described in connection with the preferred embodiment thereof, it is apparent that various alterations and modifications may be resorted to without departing from the spirit and scope of the invention as those skilled in the art will easily understand. Such alterations and modifications should be considered as falling within the spirit and scope of the invention as defined in the appended claims.

What is claimed is:

1. A recirculating heating device comprising a heat-insulated casing defining a closable chamber therein in which heat-exchange can be effected between a gaseous working medium and an object being heated and placed into said chamber; means defining a closed path coupled to said chamber; and a centrifugal fan disposed in said closed path and constituted as a heater and as a circulator for said gaseous medium, said fan having a central inlet and a peripheral outlet in said closed path in communication with said chamber for circulating said gaseous medium through said chamber and along said closed path, said fan including a rotatable impeller with blades of concave shape in the direction of rotation of the impeller, said blades having an obtuse inlet angle and an acute outlet angle, the values of said angles respectively being 145–155° and 20–25° to effect substantial heating of the gaseous working medium as its passes through the fan and along its closed path.

2. A heating device as claimed in claim 1 wherein said means defining the closed path comprises heat insulated conduits respectively connecting the chamber and the inlet and outlet of the fan.

3. A heating device as claimed in claim 1 wherein said fan is located within said chamber, said means defining said closed path comprising a partition in the chamber and behind which the fan is located, said partition being provided with openings providing communication between the chamber and the inlet and outlet of the fan.

4. A heating device as claimed in claim 1 wherein said fan comprises a shaft, a plurality of impellers consecutively mounted in said shaft, and partitions separating the impellers and including blades thereon for guiding the flow of the gaseous medium through the impellers.

References Cited

UNITED STATES PATENTS

| 2,683,448 | 7/1954 | Smith | 126—247 |
| 3,219,027 | 11/1965 | Roche | 126—247 |
| 3,297,019 | 1/1967 | Lawson | 126—247 |
| 3,320,406 | 5/1967 | Wainwright | 230—42 X |
| 1,757,239 | 5/1930 | Engeberg et al. | 230—130 |
| 2,143,100 | 1/1939 | Anderson. | |
| 3,010,187 | 11/1961 | Glasson | 230—134.5 |
| 3,252,258 | 5/1966 | Blickman et al. | 165—53 X |

FOREIGN PATENTS 848,131   9/1960   Great Britain.

ROBERT A. O'LEARY, Primary Examiner

THEOPHIL W. STREULE, Assistant Examiner

U.S. Cl. X.R.

126—247; 230—134